US012617238B2

(12) United States Patent
Hamamura et al.

(10) Patent No.: US 12,617,238 B2
(45) Date of Patent: May 5, 2026

(54) PNEUMATIC TIRE

(71) Applicant: SUMITOMO RUBBER INDUSTRIES, LTD., Kobe (JP)

(72) Inventors: Kenji Hamamura, Kobe (JP); Hiroki Kawai, Kobe (JP); Subaru Toya, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 18/686,761

(22) PCT Filed: Sep. 1, 2021

(86) PCT No.: PCT/JP2021/032035

§ 371 (c)(1),
(2) Date: Feb. 26, 2024

(87) PCT Pub. No.: WO2023/032062

PCT Pub. Date: Mar. 9, 2023

(65) Prior Publication Data

US 2024/0375443 A1 Nov. 14, 2024

(51) Int. Cl.

| | |
|---|---|
| ***B60C 11/00*** | (2006.01) |
| ***B60C 1/00*** | (2006.01) |
| ***B60C 3/04*** | (2006.01) |
| ***B60C 11/03*** | (2006.01) |

(52) U.S. Cl.

CPC ........ *B60C 11/0008* (2013.01); *B60C 1/0016* (2013.01); *B60C 3/04* (2013.01); *B60C 11/005* (2013.01); *B60C 11/033* (2013.01); *B60C 2011/0025* (2013.01)

(58) Field of Classification Search

CPC . B60C 11/005; B60C 11/0008; B60C 11/033; B60C 3/04; B60C 2011/0025; B60C 2011/0016

See application file for complete search history.

(56) References Cited

U.S. PATENT DOCUMENTS

| | | | | |
|---|---|---|---|---|
| 5,309,963 | A * | 5/1994 | Kakumu | B60C 11/033 152/902 |
| 5,355,922 | A * | 10/1994 | Kogure | B60C 9/26 152/526 |
| 2017/0267027 | A1 | 9/2017 | Kunisawa | |
| 2020/0032037 | A1 | 1/2020 | Takano et al. | |
| 2021/0129599 | A1 * | 5/2021 | Nakatani | B60C 9/18 |
| 2021/0347206 | A1 | 11/2021 | Nakatani | |
| 2023/0264518 | A1 | 8/2023 | Hamamura et al. | |
| 2023/0278372 | A1 | 9/2023 | Hamamura et al. | |
| 2023/0294455 | A1 | 9/2023 | Hamamura et al. | |

FOREIGN PATENT DOCUMENTS

| | | | | |
|---|---|---|---|---|
| EP | 3 254 872 | A1 | 12/2017 | |
| EP | 3 608 125 | A1 | 2/2020 | |
| EP | 3650493 | A2 * | 5/2020 | C08K 3/04 |
| EP | 3 763 547 | A1 | 1/2021 | |
| EP | 3 851 488 | A1 | 7/2021 | |
| JP | 11-181155 | A | 7/1999 | |
| JP | 2000-309206 | A | 11/2000 | |
| JP | 2004091505 | A * | 3/2004 | |
| JP | 2005-28999 | A | 2/2005 | |
| JP | 2005028999 | A * | 2/2005 | |
| JP | 2005-67236 | A | 3/2005 | |
| JP | 2005067236 | A * | 3/2005 | B60C 11/005 |
| JP | 2016-113051 | A | 6/2016 | |
| JP | 2017-218042 | A | 12/2017 | |
| JP | 2018-178034 | A | 11/2018 | |
| JP | 2019-89911 | A | 6/2019 | |
| JP | 2019-206643 | A | 12/2019 | |
| JP | 2020-23640 | A | 2/2020 | |
| JP | 2020-29146 | A | 2/2020 | |
| JP | 2020093681 | A * | 6/2020 | |
| JP | 6819028 | B1 | 1/2021 | |
| JP | 6835284 | B1 | 2/2021 | |
| JP | 6851579 | B1 | 3/2021 | |
| WO | WO-2018143127 | A1 * | 8/2018 | B60C 1/0016 |
| WO | WO 2018/186367 | A1 | 10/2018 | |

OTHER PUBLICATIONS

International Preliminary Report on Patentability and English translation of the Written Opinion of the International Searching Authority for International Application No. PCT/JP2021/032035, dated Mar. 5, 2024.

(Continued)

*Primary Examiner* — Katelyn W Smith
*Assistant Examiner* — Thomas Frank Schneider
(74) *Attorney, Agent, or Firm* — Birch, Stewart, Kolasch & Birch, LLP

(57) ABSTRACT

Provided is a pneumatic tire that has substantially improved crack resistance performance and durability performance; and the pneumatic tire has a tread portion with grooves formed on the surface, the tread portion is formed of a first rubber composition constituting a groove bottom portion, and a second rubber composition adjacent to the first rubber composition on the inner side of the groove bottom portion in the tire radial direction; and the acetone extractable content of the first rubber composition: E1 (% by mass) and the acetone extractable content of the second rubber composition: E2 (% by mass) satisfy (E1−E2)<20, and, when the tire is assembled to a standardized rim and the internal pressure is 250 kPa, the cross-sectional width of the tire Wt (mm), the outer diameter Dt (mm), and the volume of the space occupied by the tire: virtual volume V ($mm^3$) satisfy following (formula 1) and (formula 2).

$$1700 \leqq (Dt^2 \times \pi / 4) / Wt \leqq 2827.4 \quad \text{(formula 1)}$$

$$[(V + 1.5 \times 10^7) / Wt] \leqq 2.88 \times 10^5 \quad \text{(formula 2)}$$

13 Claims, No Drawings

(56) References Cited

OTHER PUBLICATIONS

International Search Report for PCT/JP2021/032035 (PCT/ISA/210) mailed on Nov. 16, 2021.
Written Opinion of the International Searching Authority for PCT/JP2021/032035 (PCT/ISA/237) mailed on Nov. 16, 2021.

* cited by examiner

PNEUMATIC TIRE

TECHNICAL FIELD

The present invention relates to pneumatic tires.

BACKGROUND ART

In recent years, there has been a growing demand for automobiles to be more fuel-efficient due to growing interest in environmental issues and economic efficiency; and there is also a strong demand for improved fuel efficiency.

The fuel efficiency of a tire can be evaluated by its rolling resistance, and it is known that the lower the rolling resistance, the better the fuel efficiency of tire.

Therefore, it has been proposed to reduce the rolling resistance by modifying the shape of the tire and the composition of the rubber composition constituting the tread portion of the tire (for example, Patent documents 1 to 4).

PRIOR ART DOCUMENTS

Patent Document

[Patent document 1] JP 2018-178034 A
[Patent document 2] JP 2019-089911 A
[Patent document 3] WO 2018/186367 A
[Patent document 4] JP 2019-206643 A

SUMMARY OF INVENTION

Problem to be Solved by the Invention

However, in tires manufactured using the above-mentioned conventional technology, cracks may occur at the bottom of the grooves (circumferential grooves and lateral grooves) formed in the tread (at the groove bottom), and their durability is not sufficient.

Therefore, an object of the present invention is to provide a pneumatic tire having sufficiently improved crack resistance and durability.

Means for Solving the Problem

The inventors of the present invention have conducted intensive studies to solve the above-mentioned problems, and have found that the above-mentioned problems can be solved by the invention described below, and have completed the present invention.

The invention according to a first embodiment is a pneumatic tire having a tread portion with grooves formed on the surface, wherein the tread portion is formed of a first rubber composition constituting a groove bottom portion, and a second rubber composition adjacent to the first rubber composition on the inner side of the groove bottom portion in the tire radial direction; and the acetone extractable content of the first rubber composition: E1 (% by mass) and the acetone extractable content of the second rubber composition: E2 (% by mass) satisfy (E1−E2)<20, and when the tire is assembled to a standardized rim and the internal pressure is 250 kPa, the cross-sectional width of the tire Wt (mm), the outer diameter Dt (mm), and the volume of the space occupied by the tire: virtual volume V ($mm^3$) satisfy following (formula 1) and (formula 2).

$$1700 \leqq (Dt^2 \times \pi / 4) / Wt \leqq 2827.4 \qquad \text{(formula 1)}$$

$$[(V + 1.5 \times 10^7) / Wt] \leqq 2.88 \times 10^5 \qquad \text{(formula 2)}$$

The invention according to a second embodiment is the pneumatic tire according to a first embodiment, wherein following (formula 3) is satisfied.

$$[(V + 2.0 \times 10^7) / Wt] \leqq 2.88 \times 10^5 \qquad \text{(formula 3)}$$

The invention according to a third embodiment is the pneumatic tire according to a second embodiment, wherein following (formula 4) is satisfied.

$$[(V + 2.5 \times 10^7) / Wt] \leqq 2.88 \times 10^5 \qquad \text{(formula 4)}$$

The invention according to a fourth embodiment is the pneumatic tire according to any one of embodiments one to three, wherein, when the tire is assembled to a standardized rim and the internal pressure is 250 kPa, the outer diameter of the tire: Dt (mm), and the cross-sectional height of the tire: Ht (mm) satisfy 470≤(Dt−2×Ht).

The invention according to a fifth embodiment is the pneumatic tire according to any one of embodiments one to four, wherein the loss tangent (0° C. tan δ) of the first rubber composition, measured under the conditions of a temperature of 0° C., a frequency of 10 Hz, an initial strain of 10%, and a dynamic strain rate of 2.5% is 0.72 or more.

The invention according to a sixth embodiment is the pneumatic tire according to a fifth embodiment, wherein the 0° C. tan δ is 0.75 or more.

The invention according to a seventh embodiment is the pneumatic tire according to any one of embodiments one to six, wherein the pneumatic tire has an aspect ratio of 40% or more.

The invention according to an eighth embodiment is the pneumatic tire according to a seventh embodiment, wherein the pneumatic tire has an aspect ratio of 45% or more.

The invention according to a ninth embodiment is the pneumatic tire according to an eighth embodiment, wherein the pneumatic tire has an aspect ratio of 47.5% or more.

The invention according to a tenth embodiment is the pneumatic tire according to any one of embodiments one to nine, wherein the E1, E2, and Wt satisfy the following (formula 5).

$$(E1 - E2) \times Wt < 5 \times 10^3 \qquad \text{(formula 5)}$$

The invention according to an eleventh embodiment is the pneumatic tire according to a tenth embodiment, wherein the following (formula 6) is satisfied.

$$(E1 - E2) \times Wt < 4 \times 10^3 \qquad \text{(formula 6)}$$

The invention according to a twelfth embodiment is the pneumatic tire according to an eleventh embodiment, wherein the following (formula 7) is satisfied.

$$(E1-E2)\times Wt<3\times 10^3 \quad \text{(formula 7)}$$

The invention according to a thirteenth embodiment is the pneumatic tire according to any one of embodiments one to twelve, wherein the tread has multiple circumferential grooves that extend continuously in the tire circumferential direction, and the total cross-sectional area of the plurality of circumferential grooves is 10 to 30% of the cross-sectional area of the tread portion.

The invention according to a fourteenth embodiment is the pneumatic tire according to any one of embodiments one to thirteen, wherein the tread has multiple lateral grooves extending in the axial direction of the tire, and the total volume of the plurality of lateral grooves is 2.0 to 5.0% of the volume of the tread portion.

The invention according to a fifteenth embodiment is the pneumatic tire according to any one of embodiments one to fourteen, wherein, when the outer diameter of the tire is Dt (mm) when the tire is assembled to a standardized rim and the internal pressure is 250 kPa, Dt is less than 685 (mm).

The invention according to a sixteenth embodiment is the pneumatic tire according to any one of embodiments one to fifteen, wherein the cross-sectional width Wt (mm) is less than 205 mm.

The invention according to a seventeenth embodiment is the pneumatic tire according to a sixteenth embodiment, wherein the cross-sectional width Wt (mm) is less than 200 mm.

The invention according to an eighteenth embodiment is the pneumatic tire according to any one of embodiments one to seventeen, wherein the ratio of the loss tangent (0° C. tan δ) of the first rubber composition, measured under the conditions of a temperature of 0° C., a frequency of 10 Hz, an initial strain of 10%, and a dynamic strain rate of 2.5% to the thickness of the groove bottom portion Gd (mm) (0° C. tan δ/Gd) is 0.16 or less.

The invention according to a nineteenth embodiment is the pneumatic tire according to an eighteenth embodiment, wherein the 0° C. tan δ/Gd is 0.14 or less.

Effect of the Invention

According to the present invention, it is possible to provide a pneumatic tire with sufficiently improved crack resistance and durability.

EMBODIMENTS FOR CARRYING OUT THE INVENTION

[1] Features of the Tire According to the Present Invention

First, the features of the tire according to the present invention will be explained.

1. Overview

The tire according to the present invention is characterized in that it has a tread portion with grooves formed on its surface, and the tread portion is formed of a first rubber composition constituting a groove bottom portion, and a second rubber composition adjacent to the first rubber composition on the inner side of the groove bottom portion in the tire radial direction.

It is also characterized in that the acetone extractable content of the first rubber composition: E1 (% by mass) and the acetone extractable content of the second rubber composition: E2 (% by mass) satisfy (E1−E2)<20.

It is also characterized in that, when the tire is assembled to a standardized rim and the internal pressure is 250 kPa, the cross-sectional width of the tire Wt (mm), the outer diameter Dt (mm), and the volume of the space occupied by the tire: virtual volume V ($mm^3$) satisfy following (formula 1) and (formula 2).

$$1700\leqq (Dt^2\times\pi/4)/Wt\leqq 2827.4 \quad \text{(formula 1)}$$

$$[(V+1.5\times 10^7)/Wt]\leqq 2.88\times 10^5 \quad \text{(formula 2)}$$

By having these features, it is possible to provide a tire with sufficiently improved crack resistance and durability.

In addition, in the above, the "standardized rim" is a rim defined for each tire in the standard system including the standard on which the tire is based. For example, in the case of JATMA (Japan Automobile Tire Association), it is the standard rim in applicable sizes described in the "JATMA YEAR BOOK", in the case of "ETRTO (The European Tire and Rim Technical Organization)", it is "Measuring Rim" described in "STANDARDS MANUAL", and in the case of TRA (The Tire and Rim Association, Inc.), it is "Design Rim" described in "YEAR BOOK". JATMA, ETRTO, and TRA are referred to in that order, and if there is an applicable size at the time of reference, that standard is followed. In the case of tires that are not specified in the standard, it refers a rim that can be assembled and can maintain internal pressure, that is, the rim that does not cause air leakage from between the rim and the tire, and has the smallest rim diameter, and then the narrowest rim width.

Further, the outer diameter Dt of the tire is the outer diameter of tire assembled to a standardized rim, having an internal pressure of 250 kPa and in a no-load state. The cross-sectional width Wt (mm) of the tire is the width of tire assembled to a standardized rim, having an internal pressure of 250 kPa and in a no-load state, and is the distance excluding patterns, letters, and the like on the tire side from the linear distance between the side portions (total width of the tire) including all the patterns, letters and the like on the tire side.

Further, the virtual volume V ($mm^3$) of the tire is, specifically, can be calculated by the following formula:

$$V=[(Dt/2)^2-\{(Dt/2)-Ht\}^2]\times\pi\times Wt$$

based on the outer diameter of tire Dt (mm), the tire cross-sectional height Ht (mm) (distance from the bottom of the bead to the outermost surface of the tread; ½ of the difference between the tire outer diameter and the nominal diameter of a rim), and the cross-sectional width of tire Wt (mm), in the state the tire is assembled to a standardized rim, the internal pressure is 250 kPa and no load is applied.

2. Mechanism of Effect Manifestation in Tire According to the Present Invention In the tire according to the present invention, the mechanism of effects manifestation, that is, the mechanism by which the crack resistance and durability are sufficiently improved, is presumed as follows.

(1) Tire Shape

As described above, in the present invention, the cross-sectional width Wt (mm) and the outer diameter Dt (mm) of the said tire are tried to satisfy $1600 \leq (Dt^2 \times \pi/4)/Wt \leq 2827.4$ (formula 1).

By increasing the area when the tire is viewed from the lateral direction, $[(Dt/2)^2 \times \pi) = (Dt^2 \times \pi/4)]$, with respect to the cross-sectional width Wt of the tire, and satisfying the numerical range specified in (formula 1), it is thought that it is possible to improve the heat dissipation properties of the side portion and improve the durability and low rolling resistance.

However, in such tires, since the centrifugal force during rolling increases, the radius of the tire increases greatly during rolling, and there is a risk of occurrence of cracks at the bottom of the grooves (groove bottoms) formed in the tread.

Therefore, in the present invention, the virtual volume V ($mm^3$) and cross-sectional width Wt (mm) of the tire are further adjusted to satisfy $[(V+1.5\times10^7)/Wt] \leq 2.88\times10^5$ (formula 2).

In this way, by decreasing the virtual volume V of the tire in accordance with the decrease in the cross-sectional width Wt of the tire to reduce the volume of the tire itself, it is possible to reduce the growth rate of outer diameter due to centrifugal force, and it is possible to suppress the occurrence of cracks at the bottom of the grooves. Note that in the present invention, the term "groove" refers to all grooves provided on the tread surface, such as circumferential grooves and lateral grooves.

At this time, it is more preferable that $[(V+2.0\times10^7)/Wt] \leq 2.88\times10^5$ (formula 3), and further preferable that $[(V+2.5\times10^7)/Wt] \leq 2.88\times10^5$ (formula 4).

(2) Rubber Composition Forming the Tread Portion

As described above, the tire according to the present invention has a first rubber composition that constitutes the groove bottom portion, and a second rubber composition that is adjacent to the first rubber composition on the inner side of the groove bottom in the tire radial direction. There is a relationship $(E1-E2)<20$ between the acetone-extractable content E1% by mass of the first rubber composition and the acetone-extractable content E2% by mass of the second rubber composition.

This acetone extractable content can be considered as an indicator of the amount of easily migrated components such as softeners in the rubber composition. If the difference $(E1-E2)$ in acetone extractable content (AE amount) between the first rubber composition and the second rubber composition becomes small, the migration of components that are easy to migrate from the first rubber composition to the second rubber composition is reduced, regardless of the type of rubber composition. That is, it is thought that by reducing $(E1-E2)$ to less than 20, migration of the softener and the like at the groove bottom is suppressed, and the occurrence of cracks can be suppressed, regardless of the type of rubber composition.

The difference in acetone extractable content (AE amount) between the first rubber composition and the second rubber composition preferably satisfies $(E1-E2)<19$, more preferably satisfies $(E1-E2)<18$, further preferably satisfies $(E1-E2)<17$. The lower limit of $(E1-E2)$ is not particularly limited, but usually $(E1-E2)>-40$.

Note that the acetone extractable content of the rubber composition can be measured in accordance with JIS K 6229:2015 (extraction time: 10 hours).

The ground contact surface of the tread portion is preferably formed of the first rubber composition having the same composition as the groove bottom portion. As a specific configuration of the tread portion, for example, a combination in which the first rubber composition is used as a cap rubber layer and the second rubber composition is used as a base rubber layer can be mentioned.

Further, although the specific AE amounts in the first rubber composition and the second rubber composition are not particularly limited as long as the $(E1-E2)<20$, preferably $(E1-E2)<19$, more preferably $(E1-E2)<18$, and further preferably $(E1-E2)<17$, is satisfied, both E1 and E2 are 0 or more, and preferably 3 or more, and more preferably 5 or more. Further, both E1 and E2 are usually 40 or less, preferably 37 or less, and more preferably 35 or less.

[2] More Preferred Embodiments of the Tire According to the Present Invention

The tire according to the present invention can obtain even greater effects by adopting the following embodiments.

1. Aspect Ratio

The tire according to the present disclosure is preferably a tire having an aspect ratio of 40% or more. This makes it possible to increase the area of the side portions, improve the overall heat dissipation of the tire, and suppress a decrease in rigidity in the tread portion and side portions, and it is thought that the durability of tire is improved.

Note, the aspect ratio (%) described above can be obtained by the following formula using the cross-sectional height Ht (mm) and the cross-sectional width Wt (mm) of the tire when the internal pressure is 250 kPa.

$$(Ht/Wt)\times100\ (\%)$$

The above-mentioned flattening ratio is more preferably 45% or more, and further preferably 47.5% or more, further more preferably 50% or more, particularly preferably 52.5% or more, and most preferably 55% or more. Note that there is no particular upper limit, but it is, for example, 100% or less.

2. Relationship Between AE Amount and Cross-Sectional Width Wt (Mm)

As mentioned above, the AE amount is an index indicating the amount of easily migrated components such as softeners in the components in the rubber composition, and by reducing the difference between the AE amounts in the first rubber composition and the second rubber composition $(E1-E2)$, the migration between both rubber compositions can be suppressed, and the occurrence of cracks can be suppressed.

On the other hand, the larger the cross-sectional width Wt of a tire, the larger the difference in the growth of the outer shape between the tread center portion and the shoulder portion, the greater the strain on the groove portion, and the more likely it is that cracks will occur.

Therefore, the present inventors have specifically examined the relationship between the difference in AE amount $(E1-E2)$ and the cross-sectional width Wt, and found that it is preferable that $(E1-E2)\times Wt<5\times10^3$, more preferable that $(E1-E2)\times Wt<4\times10^3$ an d further preferable that $(E1-E2)\times Wt<3\times10^3$.

3. Grooves in the Tread

The tire according to the present invention has a circumferential groove continuously extending in the tire circumferential direction in the tread portion. The ratio of the groove width $L_{80}$ at a depth of 80% of the maximum depth of the circumferential groove to the groove width $L_0$ of the circumferential groove on the ground contact surface of the tread portion ($L_{80}/L_0$) is preferably 0.3 to 0.7. As a result, it is possible to suppress the movement of the entire land portion on the bottom surface of the land portion of the tread portion, and, thereby it is thought that occurrence of the chipping of the tread portion is suppressed and the durability performance is improved. The ratio is more preferably from 0.35 to 0.65, further preferably from 0.40 to 0.60, and particularly preferably from 0.45 to 0.55.

The above-mentioned $L_0$ and $L_{80}$ refer to the linear distance ($L_0$) between the groove edges on the tread surface of the tread circumferential groove of a tire, and to the minimum distance ($L_{80}$) between the groove walls at a position where the groove depth is 80%, respectively, in a state where the tire is installed on a standardized rim, the internal pressure is 250 kPa, and no load is applied. To put it simply, they can be obtained by putting the bead portion of the section cut out in the radial direction with a width of 2 to 4 cm in a pressed state according to the rim width.

It is preferable that the tread portion has a plurality of circumferential grooves, and the total cross-sectional area of the plurality of circumferential grooves is 10 to 30% of the cross-sectional area of the tread portion. It is thought that this makes it possible to suppress the movement of the tread portion and to suppress the chipping in the tread portion, and the durability performance is improved. It is more preferably 15 to 27%, further preferably 18 to 25%, and particularly preferably 21 to 23%.

The cross-sectional area of the circumferential groove refers to the total value of the area composed of a straight line connecting the ends of the tread circumferential groove and a groove wall in a tire installed on a standardized rim, having an internal pressure of 250 kPa and in a no-load state. To put it simply, they can be obtained by putting the bead portion of the section cut out in the radial direction with a width of 2 to 4 cm in a pressed state according to the rim width.

Further, it is preferable that the tread portion has a plurality of lateral grooves extending in the tire axial direction, and the total volume of the plurality of lateral grooves is 2.0 to 5.0% of the volume of the tread portion. It is thought that this makes it possible to suppress the movement of the tread portion, suppress the chipping, and improve the durability performance. It is more preferably 2.2 to 4.0%, further preferably 2.5 to 3.5%, and particularly preferably 2.7 to 3.0%.

The volume of the lateral groove described above refers to the total volume of the volume composed of the surface connecting the ends of the lateral groove and the groove wall in a tire installed on a standardized rim, having an internal pressure of 250 kPa and in a no-load state. To put it simply, it can be obtained by calculating the volume of each lateral groove and multiplying it by the number of grooves, in a state where the bead portion of the section cut out in the radial direction with a width of 2 to 4 cm is pressed down according to the rim width. Further, the volume of the tread portion can be calculated by calculating the area of the portion excluding the lateral groove from the section and multiplying it by the outer diameter, then obtaining the difference between the calculation result and the volume of the lateral groove.

In addition, in order to suppress the chipping of tread portion and further improve durability, it is preferable that these lateral grooves include lateral grooves having a ratio of groove width Gw to groove depth Gd (Gw/Gd) of 0.50 to 0.80. The ratio is more preferably 0.53 to 0.77, further preferably 0.55 to 0.75, and particularly preferably 0.60 to 0.70.

The groove width and groove depth of the lateral groove described above refer to the maximum length of the straight lines connecting the tread surface ends of the lateral groove, which are perpendicular to the groove direction, and to the maximum depth of the lateral groove, respectively, in the tire in a state where the internal pressure is 250 kPa and no load is applied. To put it simply, it can be calculated in a state where the bead portion of the section cut out in the radial direction with a width of 2 to 4 cm is put down in a pressed state according to the rim width.

4. Tire Shape

In the tire of the present invention, when the tire is assembled to a standardized rim and the internal pressure is 250 kPa, the specific outer diameter Dt (mm) is preferably, for example, 515 mm or more, more preferably 558 mm or more, further preferably 585 mm or more, further preferably 658 mm or more, and most preferably 673 mm or more. On the other hand, it is preferably less than 843 mm, more preferably less than 725 mm, further preferably less than 707 mm, particularly preferably less than 685 mm, and most preferably less than 655 mm.

The specific cross-sectional width Wt (mm) is, for example, preferably 115 mm or more, more preferably 130 mm or more, further preferably 150 mm or more, further preferably 170 mm or more, particularly preferably 185 mm or more, and most preferably 193 mm or more. On the other hand, it is preferably less than 305 mm, more preferably less than 245 mm, further preferably less than 210 mm, particularly preferably less than 205 mm, and most preferably less than 200 mm.

The specific cross-sectional height Ht (mm) is, for example, preferably 37 mm or more, more preferably 87 mm or more, and further preferably 95 mm or more. On the other hand, it is preferably less than 180 mm, more preferably less than 112 mm, and further preferably less than 101 mm.

The specific virtual volume V is, for example, preferably 13,000,000 $mm^3$ or more, more preferably 29,000,000 $mm^3$ or more, and further preferably 36,000,000 $mm^3$ or more. On the other hand, it is preferably less than 66,000,000 $mm^3$, more preferably less than 44,000,000 $mm^3$, and further preferably less than 38,800,000 $mm^3$.

In addition, in the present invention, considering the stability of ride comfort during running, ($Dt-2\times Ht$) is preferably 450 (mm) or more, more preferably 470 (mm) or more, and further preferably 480 (mm) or more. On the other hand, in consideration of deformation of the tread portion, it is preferably less than 560 (mm), more preferably less than 530 (mm), and further preferably less than 510 (mm).

5. Loss Tangent of First Rubber Composition

In the present invention, the first rubber composition constituting the groove bottom preferably has a loss tangent (0° C. tan δ), measured under the conditions of a temperature of 0° C., a frequency of 10 Hz, an initial strain of 10%, and a dynamic strain rate of 2.5%, of 0.72 or more. Thereby, the effect of the present invention of improving crack resistance performance and durability performance can be fully exhibited. It is more preferably 0.75 or more, and further preferably 0.78 or more.

The above-mentioned loss tangent (0° C. tan δ) can be measured using, for example, a viscoelasticity measuring device such as "Eplexor (registered trademark)" manufactured by GABO.

The ratio of 0° C. tan δ to the thickness of the groove bottom (distance in the tire radial direction from the groove bottom surface to the cord layer) Gd (mm), 0° C. tan δ/Gd, is preferably 0.16 or less. Thereby, the effect of the present invention of improving crack resistance performance and durability performance can be fully exhibited. It is more preferably 0.14 or less, and further preferably 0.12 or less.

Note that the groove bottom mentioned here may be the groove bottom of any circumferential grooves, but it is preferable that at least the groove bottom of the circumferential groove with the largest groove bottom width (length in the tire width direction) satisfies the above relationship, and it is more preferred that the groove bottoms of all the circumferential grooves satisfy the above relationship.

[3] Embodiment

The present invention will be specifically described below based on embodiments.

1. Rubber Composition

The rubber composition forming the tread portion of the tire according to the present invention can be obtained by adjusting, as appropriate, the types and amounts of various compounding materials such as the rubber component, filler, softener, vulcanizing agent, and vulcanization accelerator described below. Particularly, by adjusting the softener and resin component as appropriate, it is possible to obtain a rubber composition in which the above-mentioned amount of AE is adjusted.

(1) Rubber Component

In this embodiment, as the rubber component, styrene-butadiene rubber (SBR), butadiene rubber (BR), isoprene rubber (IR) including natural rubber (NR), and nitrile rubber (NBR), which are commonly used in tire manufacturing can be used. If these rubbers (polymers) are used, by satisfying (E1−E2)<20, preferably (E1−E2)<19, more preferably (E1−E2)<18, and further preferably (E1−E2)<17, and by further satisfying (formula 1) and (formula 2), regardless of the type of rubber component, the crack resistance and durability of pneumatic tire can be improved.

Among them, it is preferable to use a rubber component containing diene rubber as a main component (90% by mass or more) for both the first rubber composition and the second rubber composition. Here, examples of the diene rubber include IR including natural rubber (NR), SBR, BR, NBR, and modified versions thereof. One type selected from these may be used alone or blends of two or more can also be used. Among the diene rubbers, it is particularly preferable to use SBR and BR.

(a) SBR

The content of SBR in 100 parts by mass of the rubber component is preferably 60 parts by mass or more, more preferably 70 parts by mass or more, and further preferably 80 parts by mass or more. On the other hand, it is preferably 100 parts by mass or less, and more preferably 95 parts by mass or less.

The weight average molecular weight of SBR is, for example, more than 100,000 and less than 2,000,000. The styrene content of SBR is at least 5% by mass or more, and especially 8% by mass or more. Further, it is preferably less than 35% by mass, more preferably less than 25% by mass, and further preferably less than 15% by mass. The vinyl bond amount (1,2-bonded butadiene unit amount) of SBR is, for example, more than 5% by mass and less than 70% by mass. Note that the structural identification of SBR (measurement of styrene content and vinyl bond amount) can be performed using, for example, a JNM-ECA series device manufactured by JEOL Ltd.

The SBR is not particularly limited, and for example, emulsion polymerized styrene butadiene rubber (E-SBR), solution polymerized styrene butadiene rubber (S-SBR), and the like can be used. SBR may be either non-modified SBR or modified SBR, and these may be used alone or in combination of two or more.

The modified SBR is an SBR having a functional group that interacts with a filler such as silica. Examples thereof include

- end-modified SBR (end-modified SBR having the above functional group at the terminal) in which at least one end of the SBR is modified with a compound having the above functional group (modifying agent),
- main chain modified SBR having the functional group in the main chain,
- main chain terminal modified SBR having the functional group at the main chain and the terminal (for example, a main chain end modified SBR having the above functional group to the main chain and having at least one end modified with the above modifying agent), and
- end-modified SBR which is modified (coupled) with a polyfunctional compound having two or more epoxy groups in the molecule, and into which an epoxy group or hydroxyl group has been introduced.

Examples of the functional group include an amino group, an amide group, a silyl group, an alkoxysilyl group, an isocyanate group, an imino group, an imidazole group, a urea group, an ether group, a carbonyl group, an oxycarbonyl group, a mercapto group, a sulfide group, a disulfide group, a sulfonyl group, a sulfinyl group, a thiocarbonyl group, an ammonium group, an imide group, a hydrazo group, an azo group, a diazo group, a carboxyl group, a nitrile group, a pyridyl group, an alkoxy group, a hydroxyl group, an oxy group, and an epoxy group. In addition, these functional groups may have a substituent.

Furthermore, as the modified SBR, for example, SBR modified with a compound (modifying agent) represented by the following formula can be used.

[Chemical formula 1]

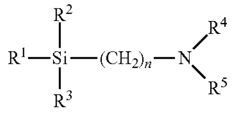

In the formula, $R^1$, $R^2$ and $R^3$ are the same or different and each represents an alkyl group, an alkoxy group, a silyloxy group, an acetal group, a carboxyl group (—COOH), a mercapto group (—SH) or a derivative thereof. $R^4$ and $R^5$ are the same or different and represent a hydrogen atom or an alkyl group. $R^4$ and $R^5$ may be combined to form a ring structure together with the nitrogen atom. n represents an integer.

As the modified SBR modified by the compound (modifying agent) represented by the above formula, SBR whose polymerization end (active end) is modified with the compound represented by the above formula can be used.

As $R^1$, $R^2$ and $R^3$, an alkoxy group is preferred, an alkoxy group having 1 to 8 carbon atoms is more preferred, and an alkoxy group having 1 to 4 carbon atoms is further preferred. As $R^4$ and $R^5$, an alkyl group is preferred, and an alkyl group having 1 to 3 carbon atoms is more preferred. n is preferably 1 to 5, more preferably 2 to 4, and further preferably 3. Further, when $R^4$ and $R^5$ are combined to form a ring structure together with a nitrogen atom, a 4- to 8-membered ring is preferable. The alkoxy group also includes a cycloalkoxy group (cyclohexyloxy group, and the like) and an aryloxy group (phenoxy group, benzyloxy group, and the like).

Specific examples of the above modifying agent include 2-dimethylaminoethyltrimethoxysilane, 3-dimethylaminopropyltrimethoxysilane, 2-dimethylaminoethyltriethoxysilane, 3-dimethylaminopropyltriethoxysilane, 2-diethylaminoethyltrimethoxysilane, 3-diethylaminopropyltrimethoxysilane, 2-diethylaminoethyltriethoxysilane, and 3-diethylaminopropyltriethoxysilane. These may be used alone or in combination of two or more.

Further, as the modified SBR, a modified SBR modified with the following compound (modifying agent) can also be used. Examples of the modifying agent include polyglycidyl ethers of polyhydric alcohols such as ethylene glycol diglycidyl ether, glycerin triglycidyl ether, trimethylolethanetriglycidyl ether, and trimethylolpropane triglycidyl ether;

polyglycidyl ethers of aromatic compounds having two or more phenol groups such as diglycidylated bisphenol A;

polyepoxy compounds such as 1,4-diglycidylbenzene, 1,3,5-triglycidylbenzene, and polyepoxidized liquid polybutadiene;

epoxy group-containing tertiary amines such as 4,4'-diglycidyl-diphenylmethylamine, and 4,4'-diglycidyl-dibenzylmethylamine;

diglycidylamino compounds such as diglycidylaniline, N, N'-diglycidyl-4-glycidyloxyaniline, diglycidyl orthotoluidine, tetraglycidylmetaxylenidiamine, tetraglycidylaminodiphenylmethane, tetraglycidyl-p-phenylenediamine, diglycidylaminomethylcyclohexane, and tetraglycidyl-1,3-bisaminomethylcyclohexane;

amino group-containing acid chlorides such as bis-(1-methylpropyl) carbamate chloride, 4-morpholincarbonyl chloride, 1-pyrrolidincarbonyl chloride, N, N-dimethylcarbamide acid chloride, and N, N-diethylcarbamide acid chloride;

epoxy group-containing silane compounds such as 1,3-bis-(glycidyloxypropyl)-tetramethyldisiloxane, and (3-glycidyloxypropyl)-pentamethyldisiloxane;

sulfide group-containing silane compound such as (trimethylsilyl) [3-(trimethoxysilyl) propyl] sulfide, (trimethylsilyl) [3-(triethoxysilyl) propyl]sulfide, (trimethylsilyl) [3-(tripropoxysilyl) propyl] sulfide, (trimethylsilyl) [3-(tributoxysilyl) propyl] sulfide, (trimethylsilyl) [3-(methyldimethoxysilyl) propyl] sulfide, (trimethylsilyl) [3-(methyldiethoxysilyl) propyl] sulfide, (trimethylsilyl) [3-(methyldipropoxysilyl) propyl] sulfide, and (trimethylsilyl) [3-(methyldibutoxysilyl) propyl] sulfide;

N-substituted aziridine compound such as ethyleneimine and propyleneimine;

alkoxysilanes such as methyltriethoxysilane, N, N-bis (trimethylsilyl)-3-aminopropyltrimethoxysilane, N, N-bis(trimethylsilyl)-3-aminopropyltriethoxysilane, N, N-bis(trimethylsilyl)aminoethyltrimethoxysilane, and N, N-bis(trimethylsilyl)aminoethyltriethoxysilane;

(thio)benzophenone compound having an amino group and/or a substituted amino group such as 4-N, N-dimethylaminobenzophenone, 4-N, N-di-t-butylaminobenzophenone, 4-N, N-diphenylamino benzophenone, 4,4'-bis(dimethylamino)benzophenone, 4,4'-bis(diethylamino)benzophenone, 4,4'-bis(diphenylamino)benzophenone, and N, N, N', N'-bis-(tetraethylamino)benzophenone;

benzaldehyde compounds having an amino group and/or a substituted amino group such as 4-N, N-dimethylaminobenzaldehyde, 4-N, N-diphenylaminobenzaldehyde, and 4-N, N-divinylamino benzaldehyde;

N-substituted pyroridone such as N-methyl-2-pyrrolidone, N-vinyl-2-pyrrolidone, N-phenyl-2-pyrrolidone, N-t-butyl-2-pyrrolidone, and N-methyl-5-methyl-2-pyrrolidone;

N-substituted piperidone such as methyl-2-piperidone, N-vinyl-2-piperidone, and N-phenyl-2-piperidone;

N-substituted lactams such as

N-methyl-ε-caprolactam, N-phenyl-ε-caprolactum, N-methyl-ω-laurilolactum, N-vinyl-ω-laurilolactum, N-methyl-ß-propiolactam, and N-phenyl-ß-propiolactam; and N, N-bis-(2,3-epoxypropoxy)-aniline, 4,4-methylene-bis-(N, N-glycidylaniline), tris-(2,3-epoxypropyl)-1,3,5-triazine-2,4,6-triones, N, N-diethylacetamide, N-methylmaleimide, N, N-diethylurea, 1,3-dimethylethylene urea, 1,3-divinylethyleneurea, 1,3-diethyl-2-imidazolidinone, 1-methyl-3-ethyl-2-imidazolidinone, 4-N, N-dimethylaminoacetophenone, 4-N, N-diethylaminoacetophenone, 1,3-bis(diphenylamino)-2-propanone, and 1,7-bis(methylethylamino)-4-heptanone. The modification with the above compound (modifying agent) can be carried out by a known method.

As the SBR, for example, SBR manufactured and sold by Sumitomo Chemical Co., Ltd., JSR Co., Ltd., Asahi Kasei Co., Ltd., Nippon Zeon Co., Ltd., etc. can be used. Note that SBR may be used alone or in combination of two or more types.

(b) B.R.

The content of BR in 100 parts by mass of the rubber component is preferably 5 parts by mass or more and 15 parts by mass or less.

The weight average molecular weight of BR is, for example, more than 100,000 and less than 2,000,000. The amount of vinyl bonds in BR is, for example, more than 1% by mass and less than 30% by mass. The cis content of BR is, for example, more than 1% by mass and less than 98% by mass. The trans amount in BR is, for example, more than 1% by mass and less than 60% by mass. Note that the cis content can be measured by infrared absorption spectroscopy.

The BR is not particularly limited, and BR with a high cis content (cis content of 90% or more), BR with a low cis content, BR containing syndiotactic polybutadiene crystals, etc. can be used. The BR may be either unmodified BR or modified BR, and examples of the modified BR include modified BR into which the above-mentioned functional groups have been introduced. These may be used alone or in combination of two or more. Note that the cis content can be measured by infrared absorption spectroscopy.

As the BR, for example, products manufactured by Ube Industries, Ltd., JSR Corporation, Asahi Kasei Co., Ltd., Nippon Zeon Co., Ltd., etc. can be used.

(c) Other Rubber Components

In this embodiment, as described above, rubbers (polymers) commonly used in tire manufacturing such as isoprene rubber (IR) and nitrile rubber (NBR) may be contained, as other rubber components.

(2) Compounding Materials Other than Rubber Components (a) Filler

In this embodiment, the rubber composition preferably contains a filler. Examples of specific fillers include silica, carbon black, calcium carbonate, talc, alumina, clay, aluminum hydroxide, and mica. Among them, silica and carbon black are preferably used as reinforcing agents. In addition, when using silica, it is preferable to use it together with a silane coupling agent.

(a) Silica

The rubber composition preferably contains silica as a filling reinforcing agent. The BET specific surface area of silica is preferably more than 140 $m^2$/g, more preferably more than 160 $m^2$/g, from the viewpoint of obtaining good durability performance. On the other hand, from the viewpoint of obtaining good rolling resistance during high-speed running, it is preferably less than 250 $m^2$/g, and more preferably less than 220 $m^2$/g. Note that the BET specific surface area described above is the value of $N_2SA$ measured by the BET method according to ASTM D3037-93.

When using silica as a filling reinforcing agent, in the first rubber composition, the content of the silica based on 100 parts by mass of the rubber component is preferably 40 parts by mass or more, more preferably 60 parts by mass or more, and further preferably 80 parts by mass or more. On the other hand, it is preferably 200 parts by mass or less, more preferably 150 parts by mass or less, and further preferably 120 parts by mass or less. In the case of the second rubber composition, since, contrary to the increase or decrease in content of silica, the AE amount also increases or decreases, the content of the silica is adjusted as appropriate in accordance with the desired AE amount.

Examples of the silica include dry silica (anhydrous silica), wet silica (hydrated silica), and the like. Among these, wet silica is preferred because it has large number of silanol groups.

As the silica, for example, products manufactured by Degussa Co., Ltd., Rhodia Co., Ltd., Tosoh Silica Co., Ltd., Solvay Japan Co., Ltd., Tokuyama Corporation, etc. can be used.

(b) Silane Coupling Agent

The rubber composition preferably contains a silane coupling agent together with silica. The silane coupling agent is not particularly limited, and examples thereof include sulfide-based ones such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl) tetrasulfide, bis(2-trimethoxysilylethyl)tetrasulfide, bis(2-triethoxysilylethyl)trisulfide, bis(4-trimethoxysilylbutyl) trisulfide, bis(3-triethoxysilylpropyl)disulfide, bis(2-triethoxysilylethyl)disulfide, bis(4-triethoxysilylbutyl) disulfide, bis(3-trimethoxysilylpropyl) disulfide, bis(2-trimethoxysilylethyl)disulfide, bis(4-trimethoxysilylbutyl) disulfide, 3-trimethoxysilylpropyl-N, N-dimethylthiocarbamoyltetrasulfide, 2-triethoxysilylethyl-N, N-dimethylthiocarbamoyltetrasulfide, and 3-triethoxysilylpropylmethacrylatemonosulfide;

- mercapto-based ones such as 3-mercaptopropyltrimethoxysilane, 2-mercaptoethyltriethoxysilane, and NXT and NXT-Z manufactured by Momentive;
- vinyl-based ones such as vinyl triethoxysilane, and vinyl trimethoxysilane;
- amino-based ones such as 3-aminopropyltriethoxysilane and 3-aminopropyltrimethoxysilane;
- glycidoxy-based ones such as γ-glycidoxypropyltriethoxysilane and γ-glycidoxypropyltrimethoxysilane;
- nitro-based ones such as 3-nitropropyltrimethoxysilane, and 3-nitropropyltriethoxysilane; and
- chloro-based ones such as 3-chloropropyltrimethoxysilane and 3-chloropropyltriethoxysilane. These may be used alone or in combination of two or more.

As the silane coupling agent, for example, products manufactured by Degussa Co., Ltd., Momentive Co., Ltd., Shin-Etsu Silicone Co., Ltd., Tokyo Chemical Industry Co., Ltd., Azumax Co., Ltd., Dow Corning Toray Co., Ltd., etc. can be used.

The content of the silane coupling agent is, for example, more than 3 parts by mass and less than 25 parts by mass based on 100 parts by mass of silica.

(c) Carbon Black

The rubber composition preferably contains carbon black. In the first rubber composition, the content of carbon black is, for example, more than 1 part by mass and less than 200 parts by mass based on 100 parts by mass of the rubber component. In the case of the second rubber composition, the AE amount also increases or decreases contrary to the increase or decrease in the content of carbon black, so the content is adjusted as appropriate in accordance with the desired AE amount.

Carbon black is not particularly limited, and includes furnace black (furnace carbon black) such as SAF, ISAF, HAF, MAF, FEF, SRF, GPF, APF, FF, CF, SCF and ECF; acetylene black (acetylene carbon black); thermal blacks (thermal carbon blacks) such as FT and MT; channel blacks (channel carbon blacks) such as EPC, MPC and CC; graphite, etc. These may be used alone or in combination of two or more.

The nitrogen adsorption specific surface area ($N_2$ SA) of carbon black is, for example, more than 30 $m^2$/g and less than 250 $m^2$/g. The amount of dibutyl phthalate (DBP) absorbed by carbon black is, for example, more than 50 ml/100 g and less than 250 ml/100 g. Note that the nitrogen adsorption specific surface area of carbon black is measured according to ASTM D4820-93, and the DBP absorption amount is measured according to ASTM D2414-93.

Specific carbon blacks are not particularly limited, and include N134, N110, N220, N234, N219, N339, N330, N326, N351, N550, N762, and the like. Examples of the commercially available products include products manufactured by Asahi Carbon Co., Ltd., Cabot Japan Co., Ltd., Tokai Carbon Co., Ltd., Mitsubishi Chemical Co., Ltd., Lion Corporation, Shin Nikka Carbon Co., Ltd., and Columbia Carbon Co. Ltd., can be used. These may be used alone or in combination of two or more.

(d) Other Fillers

In addition to the carbon black and silica described above, the rubber composition further contains fillers commonly used in the tire industry, such as calcium carbonate, talc, alumina, clay, aluminum hydroxide, and mica. The content of these is, for example, more than 0.1 part by mass and less than 200 parts by mass based on 100 parts by mass of the rubber component.

(b) Softener

The rubber composition may contain oil (including extender oil), liquid rubber, or the like as a softener. In the case of the first rubber composition, the total content is, for example, preferably 10 parts by mass or more, more preferably 20 parts by mass or more, and further preferably 25 parts by mass or more, based on 100 parts by mass of the rubber component. Further, it is preferably 100 parts by mass or less, more preferably 60 parts by mass or less, and further preferably 40 parts by mass or less. Note that the content of oil also includes the amount of oil contained in the rubber (oil-extended rubber). In the case of the second rubber composition, the AE amount also increases or decreases contrary to the increase or decrease in the content of the softener, so the content is adjusted as appropriate in accordance with the desired AE amount.

Examples of the oil include mineral oil (generally referred to as process oil), vegetable oil, or mixtures thereof. As the mineral oil (process oil), for example, paraffinic process oil, aromatic process oil, naphthenic process oil, and the like can be used. Examples of the vegetable oils include castor oil, cottonseed oil, linseed oil, rapeseed oil, soybean oil, palm oil, coconut oil, peanut oil, rosin, pine oil, pine tar, tall oil, corn oil, rice bran oil, safflower oil, sesame oil, olive oil, sunflower oil, palm kernel oil, camellia oil, jojoba oil, macadamia nut oil, and tung oil.

Examples of the specific process oils (mineral oils) include products manufactured by Idemitsu Kosan Co., Ltd., Sankyo Yuka Kogyo Co., Ltd., Japan Energy Co., Ltd., Orisoi Co., Ltd., H&R Co., Ltd., Toyokuni Oil Co., Ltd., Showa Shell Sekiyu K.K., Fuji Kosan Co., Ltd., etc.

The liquid rubber mentioned as a softening agent is a polymer that is in a liquid state at room temperature (25° C.) and that has the same monomers as solid rubber as constituent elements. Examples of the liquid rubber include farnesene polymers, liquid diene polymers, and hydrogenated products thereof.

The farnesene-based polymer is a polymer obtained by polymerizing farnesene, and has a structural unit based on farnesene. Farnesene includes isomers such as α-farnesene ((3E, 7E)-3,7,11-trimethyl-1,3,6,10-dodecatetraene) and ß-farnesene (7,11-dimethyl-3-methylene-1,6,10-dodecatorien).

The farnesene-based polymer may be a homopolymer of farnesene (farnesene homopolymer) or a copolymer of farnesene and a vinyl monomer (farnesene-vinyl monomer copolymer).

Examples of the liquid diene polymer include a liquid styrene-butadiene copolymer (liquid SBR), a liquid butadiene polymer (liquid BR), a liquid isoprene polymer (liquid IR), and a liquid styrene isoprene copolymer (liquid SIR).

The liquid diene polymer has a polystyrene-equivalent weight average molecular weight (Mw) measured by gel permeation chromatography (GPC) of, for example, more than $1.0\times10^3$ and less than $2.0\times10^5$. Here, in this description, Mw of the liquid diene polymer is a polystyrene conversion value measured by gel permeation chromatography (GPC).

The content of liquid polymer (total content of liquid farnesene-based polymer, liquid diene polymer, etc.) is, for example, more than 1 part by mass and less than 100 parts by mass based on 100 parts by mass of the rubber component.

As the liquid rubber, for example, products manufactured by Kuraray Co., Ltd., Clay Valley Co., Ltd., etc. can be used.

(c) Resin Component

It is preferable that the rubber composition contains a resin component, if necessary. The resin component may be solid or liquid at room temperature. Specific resin components include styrenic resin, coumaron resin, terpene resin, C5 resin, C9 resin, C5C9 resin, and acrylic resin, and two or more types may be used in combination. In the case of the first rubber composition, the content of the resin component is preferably more than 20 parts by mass, more preferably more than 30 parts by mass, based on 100 parts by mass of the rubber component, for example. Moreover, it is preferably less than 70 parts by mass, and more preferably less than 50 parts by mass. In the case of the second rubber composition, since the AE amount also increases or decreases in accordance with the increase or decrease in the content of the resin component, the content is adjusted as appropriate in accordance with the desired AE amount.

The styrenic resin is a polymer using a styrenic monomer as a constituent monomer, and examples thereof include a polymer obtained by polymerizing a styrene monomer as a main component (50% by mass or more). Specifically, it includes homopolymers obtained by individually polymerizing styrenic monomers (styrene, o-methylstyrene, m-methylstyrene, p-methylstyrene, α-methylstyrene, p-methoxystyrene, p-tert-butylstyrene, p-phenylstyrene, o-chlorostyrene, m-chlorostyrene, p-chlorostyrene, etc.), copolymers obtained by copolymerizing two or more of the styrene monomers, and, in addition, copolymers obtained by copolymerizing a styrene monomer and other monomers that can be copolymerized with the styrene monomer.

Examples of the other monomers include acrylonitriles such as acrylonitrile and methacrylate; unsaturated carboxylic acids such as acrylic acid and methacrylic acid; unsaturated carboxylic acid esters such as methyl acrylate and methyl methacrylate; dienes such as chloroprene, butadiene, and isoprene, olefins such as 1-butene and 1-pentene; α, ß-unsaturated carboxylic acids such as maleic anhydride, and acid anhydrides thereof.

Among coumaron-based resins, coumaron indene resin is preferred. Coumaron indene resin is a resin containing coumaron and indene as monomer components that constitute the skeleton (main chain) of the resin. In addition to coumaron and indene, a monomer component such as styrene, α-methylstyrene, methylindene, and vinyltoluene may be contained in the skeleton.

The content of the coumaron indene resin is preferably, for example, more than 1.0 parts by mass and less than 50.0 parts by mass based on 100 parts by mass of the rubber component.

The hydroxyl value (OH value) of the coumarone-indene resin is, for example, more than 15 mgKOH/g and less than 150 mgKOH/g. The OH value is the amount of potassium hydroxide required to neutralize acetic acid bonded to a hydroxyl group when 1 g of the resin is acetylated, and is expressed in milligrams. It is a value measured by potentiometric titration method (JIS K 0070: 1992).

The softening point of the coumarone-indene resin is, for example, higher than 30° C. and lower than 160° C. The softening point is the temperature at which the ball drops when the softening point defined in JIS K 6220-1: 2001 is measured by a ring-ball type softening point measuring device.

Examples of the terpene resins include polyterpenes, terpene phenols, and aromatic-modified terpene resins. Polyterpene is a resin obtained by polymerizing a terpene compound and a hydrogenated product thereof. The terpene compound is a hydrocarbon having a composition of $(C_5H_8)_n$ or an oxygen-containing derivative thereof, which is a compound having a terpene classified as monoterpenes ($C_{10}H_{16}$), sesquiterpenes ($C_{15}H_{24}$), diterpenes ($C_{20}H_{32}$), etc. as the basic skeleton. Examples thereof include α-pinene, ß-pinene, dipentene, limonene, myrcene, alloocimene, osimene, α-phellandrene, α-terpinene, γ-terpinene, terpinolene, 1,8-cineol, 1,4-cineol, α-terpineol, ß-terpineol, and γ-terpineol.

Examples of the polyterpene include terpene resins such as α-pinene resin, ß-pinene resin, limonene resin, dipentene resin, and ß-pinene/limonene resin, which are made from the above-mentioned terpene compound, as well as a hydrogenated terpene resin obtained by hydrogenating the terpene resin. Examples of the terpene phenol include a resin obtained by copolymerizing the above-mentioned terpene compound and the phenol compound, and a resin obtained by hydrogenating above-mentioned resin. Specifically, a resin obtained by condensing the above-mentioned terpene compound, the phenol compound and the formalin can be mentioned. Examples of the phenol compound include phenol, bisphenol A, cresol, and xylenol. Examples of the aromatic-modified terpene resin include a resin obtained by modifying a terpene resin with an aromatic compound, and a resin obtained by hydrogenating above-mentioned resin. The aromatic compound is not particularly limited as long as it is a compound having an aromatic ring, and examples thereof include phenol compounds such as phenol, alkylphenol, alkoxyphenol, and unsaturated hydrocarbon group-containing phenol; naphthol compounds such as naphthol, alkylnaphthol, alkoxynaphthol, and unsaturated hydrocarbon group-containing naphthols; styrene derivatives such as styrene, alkylstyrene, alkoxystyrene, unsaturated hydrocarbon group-containing styrene; coumaron, and indene.

The “C5 resin” refers to a resin obtained by polymerizing a C5 fraction. Examples of the C5 fraction include petroleum fractions having 4 to 5 carbon atoms such as cyclopentadiene, pentene, pentadiene, and isoprene. As the C5-based petroleum resin, a dicyclopentadiene resin (DCPD resin) is preferably used.

The “C9 resin” refers to a resin obtained by polymerizing a C9 fraction, and may be hydrogenated or modified. Examples of the C9 fraction include petroleum fractions having 8 to 10 carbon atoms such as vinyltoluene, alkylstyrene, indene, and methyl indene. As the specific examples, a coumarone-indene resin, a coumarone resin, an indene resin, and an aromatic vinyl resin are preferably used. As the aromatic vinyl resin, a homopolymer of α-methylstyrene or styrene or a copolymer of α-methylstyrene and styrene is preferable because it is economical, easy to process, and excellent in heat generation. A copolymer of α-methylstyrene and styrene is more preferred. As the aromatic vinyl-based resin, for example, those commercially available from Clayton Co., Eastman Chemical Co., etc. can be used.

The “C5C9 resin” refers to a resin obtained by copolymerizing the C5 fraction and the C9 fraction, and may be hydrogenated or modified. Examples of the C5 fraction and the C9 fraction include the above-mentioned petroleum fraction. As the C5C9 resin, for example, those commercially available from Tosoh Corporation, LUHUA Co., etc. can be used.

Although the acrylic resin is not particularly limited, for example, a solvent-free acrylic resin can be used.

As the solvent-free acrylic resin, a (meth)acrylic resin (polymer) synthesized by a high-temperature continuous polymerization method (high-temperature continuous lump polymerization method: a method described in U.S. Pat. No. 4,414,370 B, JP 84-6207 A, JP 93-58805 A, JP 89-313522 A, U.S. Pat. No. 5,010,166 B, Toa Synthetic Research Annual Report TREND2000 No. 3, p42-45, and the like) without using polymerization initiators, chain transfer agents, organic solvents, etc. as auxiliary raw materials as much as possible, can be mentioned. In the present invention, (meth) acrylic means methacrylic and acrylic.

Examples of the monomer component constituting the acrylic resin include (meth)acrylic acid, and (meth)acrylic acid derivatives such as (meth)acrylic acid ester (alkyl ester, aryl ester, aralkyl ester, etc.), (meth)acrylamide, and (meth) acrylamide derivative.

In addition, as the monomer component constituting the acrylic resin, aromatic vinyl compounds such as styrene, α-methylstyrene, vinyltoluene, vinylnaphthalene, divinylbenzene, trivinylbenzene, divinylnaphthalene, and the like may be used, together with (meth)acrylic acid or (meth) acrylic acid derivative.

The acrylic resin may be a resin composed of only a (meth)acrylic component or a resin also having a component other than the (meth)acrylic component. Further, the acrylic resin may have a hydroxyl group, a carboxyl group, a silanol group, or the like.

Examples of the resin component which can be used include products of Maruzen Petrochemical Co., Ltd., Sumitomo Bakelite Co., Ltd., Yasuhara Chemical Co., Ltd., Tosoh Corporation, Rutgers Chemicals Co., Ltd., BASF Co., Ltd., Arizona Chemical Co., Ltd., Nitto Chemical Co., Ltd., Nippon Shokubai Co., Ltd., JX energy Co., Ltd., Arakawa Chemical Industry Co., Ltd., Taoka Chemical Industry Co., Ltd., etc.

(d) Anti-Aging Agent

The rubber composition may also contain an anti-aging agent. The content of the anti-aging agent is, for example, more than 1 part by mass and less than 10 parts by mass based on 100 parts by mass of the rubber component.

Examples of the antiaging agent include naphthylamine-based antiaging agents such as phenyl-α-naphthylamine; diphenylamine-based antiaging agents such as octylated diphenylamine and 4,4'-bis(α, α'-dimethylbenzyl)diphenylamine; p-phenylenediamine-based anti-aging agent such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline-based anti-aging agent such as a polymer of 2,2,4-trimethyl-1,2-dihydroquinolin; monophenolic anti-aging agents such as 2,6-di-t-butyl-4-methylphenol, styrenated phenol; bis, tris, polyphenolic anti-aging agents such as tetrakis-[methylene-3-(3',5'-di-t-butyl-4'-hydroxyphenyl)propionate]methane. These may be used alone or in combination of two or more.

As specific anti-aging agents, for example, products of Seiko Chemical Co., Ltd., Sumitomo Chemical Co., Ltd., Ouchi Shinko Chemical Industry Co., Ltd., Flexsys Co., Ltd., etc. can be used.

(e) Stearic Acid

The rubber composition may also contain stearic acid. The content of stearic acid is, for example, more than 0.5 parts by mass and less than 10.0 parts by mass based on 100 parts by mass of the rubber component. As the stearic acid, conventionally known ones can be used, and for example, products manufactured by NOF Corporation, NOF Corporation, Kao Corporation, Fujifilm Wako Pure Chemical Industries, Ltd., Chiba Fatty Acid Co., Ltd., etc. can be used.

(f) Zinc Oxide

The rubber composition may contain zinc oxide. The content of zinc oxide is, for example, more than 0.5 parts by mass and less than 10 parts by mass based on 100 parts by mass of the rubber component. As zinc oxide, conventionally known ones such as products of Mitsui Mining & Smelting Co., Ltd., Toho Zinc Co., Ltd., Hakusui Tech Co., Ltd., Shodo Chemical Industry Co., Ltd., Sakai Chemical Industry Co., Ltd., etc., can be used.

(g) Wax

Each rubber composition preferably contain wax. The content of wax is, for example, 0.5 to 20 parts by mass, preferably 1.5 to 15 parts by mass, and more preferably 3.0 to 10 parts by mass, based on 100 parts by mass of the rubber component.

The wax is not particularly limited, and examples thereof include petroleum waxes such as paraffin wax and microcrystalline wax; natural waxes such as vegetable waxes and animal waxes; and synthetic waxes such as polymers of ethylene or propylene. These may be used alone or in combination of two or more.

As the wax, for example, products manufactured by Ouchi Shinko Chemical Industry Co., Ltd., Nippon Seiro Co., Ltd., and Seiko Kagaku Co., Ltd. can be used.

(h) Crosslinking Agent and Vulcanization Accelerator

The rubber composition preferably contains a crosslinking agent such as sulfur. The content of the crosslinking agent is, for example, more than 0.1 parts by mass and less than 10.0 parts by mass based on 100 parts by mass of the rubber component.

Sulfur includes powdered sulfur, precipitated sulfur, colloidal sulfur, insoluble sulfur, highly dispersed sulfur, soluble sulfur, and the like commonly used in the rubber industry. These may be used alone or in combination of two or more.

As the sulfur, for example, products manufactured by Tsurumi Chemical Industry Co., Ltd., Karuizawa Sulfur Co., Ltd., Shikoku Chemicals Corporation, Flexsys Co., Ltd., Nippon Kanryu Kogyo Co., Ltd., Hosoi Chemical Industry Co., Ltd., etc. can be used.

Examples of the cross-linking agent other than sulfur include vulcanizing agents containing a sulfur atom such as Tackirol V200 manufactured by Taoka Chemical Industry Co., Ltd., DURALINK HTS (1,6-hexamethylene-sodium dithiosulfate dihydrate) manufactured by Flexsys Co., Ltd., and KA9188 (1,6-bis(N, N'-dibenzylthiocarbamoyldithio) hexane) manufactured by Lanxess Co., Ltd., and organic peroxides such as dicumylperoxide.

The rubber composition preferably contains a vulcanization accelerator. The content of the vulcanization accelerator is, for example, more than 0.3 parts by mass and less than 10.0 parts by mass based on 100 parts by mass of the rubber component.

Examples of the vulcanization accelerator include thiazole-based vulcanization accelerators such as 2-mercaptobenzothiazole, di-2-benzothiazolyl disulfide, and N-cyclohexyl-2-benzothiadylsulfenamide;

thiuram-based vulcanization accelerators such as tetramethylthiuram disulfide (TMTD), tetrabenzyltiuram disulfide (TBzTD), and tetrakis (2-ethylhexyl) thiuram disulfide (TOT-N);

sulfenamide-based vulcanization accelerators such as N-cyclohexyl-2-benzothiazolesulfenamide, N-t-butyl-2-benzothiazolyl sulfenamide, N-oxyethylene-2-benzothiazolesulfenamide, N-oxyethylene-2-benzothiazolesulfenamide, and N, N'-diisopropyl-2-benzothiazolesulfenamide; and guanidine-based vulcanization accelerators such as diphenylguanidine, di-ortho-tolylguanidine and ortho-tolylbiguanidine. These may be used alone or in combination of two or more.

(i) Others

In addition to the above-mentioned components, the rubber composition may further contain additives commonly used in the tire industry, such as fatty acid metal salts, carboxylic acid metal salts, and organic peroxides. The content of these additives is, for example, more than 0.1 part by mass and less than 200 parts by mass based on 100 parts by mass of the rubber component.

2. Production of Tread Rubber Composition

The rubber composition can be produced by a general method, for example, by a manufacturing method comprising a base kneading step in which the rubber component is kneaded with a filler such as silica or carbon black, and a finishing step in which the kneaded product obtained in the base kneading step is kneaded with a crosslinking agent.

Kneading can be performed using a known (closed type) kneader such as a Banbury mixer, a kneader, or an open roll.

The kneading temperature in the base kneading step is, for example, higher than 50° C. and lower than 200° C., and the kneading time is, for example, longer than 30 seconds and shorter than 30 minutes. In the base kneading process, in addition to the above ingredients, compounding agents conventionally used in the rubber industry, such as softeners such as oil, stearic acid, zinc oxide, anti-aging agents, wax, and vulcanization accelerators, may be appropriately added and kneaded as necessary.

In the final kneading step, the kneaded material obtained in the base kneading step and a crosslinking agent are kneaded. The kneading temperature in the final kneading step is, for example, higher than room temperature and lower than 80° C., and the kneading time is, for example, longer than 1 minute and shorter than 15 minutes. In the finishing kneading step, in addition to the above-mentioned components, a vulcanization accelerator, zinc oxide, etc. may be appropriately added and kneaded as necessary.

As described above, in this kneading operation, the first rubber composition or the second rubber composition can be obtained by adjusting the content of the softener and the resin component.

3. Tire Manufacturing

The tire of the present invention is manufactured by a conventional method using the unvulcanized rubber composition obtained through the finishing kneading step. Specifically, for example, first, the first rubber composition is molded as a cap rubber constituting the groove bottom, and then the second rubber composition is molded as a base rubber adjacent to the inside in the tire radial direction.

Next, an unvulcanized tire is produced by molding it together with other tire members on a tire molding machine using a normal method. Specifically, on a molding drum, the inner liner as a member to ensure the air-tightness of the tire, the carcass as a member to withstand the load, impact and filling air pressure received by the tire, and a belt as a member to strongly tighten the carcass to increase the rigidity of the tread, etc. are wound, both ends of the carcass are fixed to both side edges, a bead part as a member for fixing the tire to the rim is arranged, and they are formed into a toroid shape. Then the tread is bonded on the center of the outer circumference, and the sidewall portion as a member that protects the carcass and resists bending is bonded on the outside in the radial direction to produce an unvulcanized tire.

In this embodiment, it is preferable to provide an inclined belt layer extending at an angle of 15° to 300 with respect to the circumferential direction of the tire, as a belt, thereby ensuring the durability of the tire. At the same time, the rigidity of the tread can be maintained sufficiently. Moreover, since it can be restrained in the circumferential direction, it becomes easier to suppress growth of the outer diameter.

Thereafter, a tire is obtained by heating and pressurizing the produced unvulcanized tire in a vulcanizer. The vulcanization process can be carried out by applying known vulcanization means. The vulcanization temperature is, for example, higher than 120° C. and lower than 200° C., and the vulcanization time is, for example, longer than 5 minutes and shorter than 15 minutes.

At this time, the tire is molded into a shape that satisfies the above-mentioned (formula 1) and (formula 2) when it is assembled into a standardized rim and the internal pressure is set to 250 kPa.

In addition, when a layer of a sealing material, a sponge material, or an electronic component such as a sensor, which will be described later, is provided in the tire, it is preferable to affix these to the inner surface of the tire after the vulcanization.

Note that, examples of specific tires that can satisfy the above (formula 1) and (formula 2) include tires with size markings, 145/60R18, 145/60R19, 155/55R18, 155/55R19, 155/70R17, 155/70R19, 165/55R20, 165/55R21, 165/60R19, 165/65R19, 165/70R18, 175/55R19, 175/55R20, 175/55R22, 175/60R18, 185/55R19, 185/60R20, 195/50R20, 195/55R20, etc.

In this embodiment, it is preferable to apply the tire, that can satisfy (formula 1) and (formula 2), to pneumatic tires for passenger cars. As a result, the present invention can more effectively contribute to solving the problem of the present invention, which is to provide a pneumatic tire that not only has low rolling resistance and excellent fuel efficiency, but also has sufficiently improved crack resistance and durability. Note that, the "passenger car tire" as used herein refers to a tire that is mounted on a four-wheeled vehicle and has a maximum load capacity of 1000 kg or less.

Further, the pneumatic tire of the present invention may have a sealant layer for puncture prevention on the inner peripheral surface of the tread portion, or may have a sponge material further adhered to the inner peripheral surface of the sealant layer. Furthermore, the pneumatic tire may have an electronic component such as a sensor provided inside the pneumatic tire.

EXAMPLES

Hereinafter, the present invention will be explained in more detail with reference to Examples. In the following, a tread with a two-layer structure is produced using the first rubber composition as the cap rubber and the second rubber composition as the base rubber. Although the AE amount is changed by changing the formulation of the second rubber composition with respect to the formulation of the first rubber composition, this does not preclude taking other embodiments.

[Manufacture of Rubber Composition for Tread 1]

Prior to manufacturing each test tire evaluated in Experiments 1 to 4 below, a tread rubber composition to be used in manufacturing each test tire is first manufactured.

(1) Compounding Materials

First, as compounding materials for the first rubber composition, 90 parts by mass of SBR (JSR1502 manufactured by JSR Corporation), 10 parts by mass of BR (UBEPOL BR150B manufactured by Ube Industries, Ltd.), 30 parts by mass of oil (process oil A/OMIX manufactured by Sankyo Yuka Kogyo Co., Ltd.), 5 parts by mass of carbon black (Show Black N134 manufactured by Cabot Japan Co., Ltd.), 100 parts by mass of silica (Ultrasil 9100GR manufactured by Eponic Industries), 9 parts by mass of silane coupling agent (Si363 manufactured by Degussa Co. Ltd.), 40 parts by mass of resin (α-methylstyrene resin manufactured by Clayton Co. Ltd.), 1.5 parts by mass of wax (OZOACE-0355 manufactured by Nippon Seiro Co., Ltd.), 2 parts by mass of stearic acid ("Tsubaki" manufactured by NOF Corporation), 2 parts by mass of zinc oxide (zinc white No. 1, manufactured by Mitsui Mining & Smelting Co., Ltd.), 1 part by mass of anti-aging agent (Nocrac 6C manufactured by Ouchi Shinko Chemical Industry Co., Ltd.), 1 part by mass of vulcanization accelerator (Nocceler CZ-G (CZ) manufactured by Ouchi Shinko Chemical Industry Co., Ltd.), 1 part by mass of vulcanization accelerator (Nocceler D(DPG) manufactured by Ouchi Shinko Chemical Industry Co., Ltd.) and 2 parts by mass of sulfur (powdered sulfur manufactured by Tsurumi Chemical Industry Co., Ltd.) are prepared.

On the other hand, the same compounding material as the first rubber composition is prepared as the compounding material for the second rubber composition. However, the amounts of oil, resin, silica, and carbon black are adjusted so that the AE amount is different from that of the first rubber composition.

(2) Manufacture of Rubber Composition

The compounding materials of the first rubber composition and the second rubber composition described above other than sulfur and the vulcanization accelerator are kneaded using a Banbury mixer at 150° C. for 5 minutes to obtain a kneaded product. Thereafter, sulfur and a vulcanization accelerator are added and kneaded for 5 minutes at 80° C. using an open roll to obtain a first rubber composition and a second rubber composition.

Experiment 1

In this experiment, tires of size 175 are prepared and evaluated.

1. Tire Manufacturing

Of the first rubber composition and second rubber composition obtained above, by using the first rubber composition as a cap rubber and using the second rubber composition as a base rubber, a tread with a two-layer structure is produced. The produced tread is then bonded together with other tire members to form an unvulcanized tire. The formed unvulcanized tire is then press vulcanized for 10 minutes at 170° C. to produce each test tire of size 175 type (Examples 1-1 to 1-5 and Comparative Examples 1-1 to 1-5).

In each test tire, the above-mentioned ($L_{80}/L_0$) is 0.5, the total cross-sectional area of the circumferential grooves is 22% of the cross-sectional area of the tread, and the total volume of the lateral grooves containing lateral grooves with groove width/groove depth of 0.65 is 3.5% of the volume of the tread portion. Further, the thickness of the groove bottom Gd is set to 5.5 mm.

2. Parameter Calculation

The outer diameter Dt (mm), cross-sectional width Wt (mm), cross-sectional height Ht (mm), and aspect ratio (%) of each test tire are determined, and the virtual volume V ($mm^3$) was determined.

In addition, test pieces are cut out from both the cap layer and base layer of the tread of each test tire, and the AE amounts (E1, E2) are measured for each test piece in accordance with JIS K 6229:2015, and E1−E2 is determined (E1: 26% by mass). The results are shown in Tables 1 and 2.

In addition, for each test piece cut out from the cap layer, the loss tangent (0° C. tan δ) is measured under the conditions of a temperature of 0° C., a frequency of 10 Hz, an initial strain of 10%, and a dynamic strain rate of 2.5% using a viscoelasticity measuring device of "Eplexor (registered trademark)" manufactured by GABO. The loss tangent is 0.76 (0° C. tan δ/Gd=0.138).

Then, $(Dt-2\times Ht)$, $(Dt^2\times\pi/4)/Wt$, $(V+1.5\times10^7)/Wt$, $(V+2.0\times10^7)/Wt$, $(V+2.5\times10^7)/Wt$, and $(E1-E2)\times Wt$ are calculated. The results are shown in Tables 1 and 2.

3. Performance Evaluation Test (1) Evaluation of Crack Resistance Performance

After each test tire was subjected to ozone deterioration treatment by keeping it in an ozone atmosphere, it is installed on all wheels of a vehicle (domestic FF vehicle, displacement 2000 cc), and the tires are filled with air so that the internal pressure is 250 kPa. After circling the test course on a dry road surface for 10 km at a speed of 120 km/h, cracks with a length of 0.1 mm or more that occurred in the grooves within a predetermined range of the tread are measured, and the total length is calculated. The evaluation is a relative evaluation based on the measurement results of Comparative Examples 1-5 and expressed as an index based on the following formula. The larger the value, the better the crack resistance performance.

$$\text{Crack resistance performance} = (\text{measurement results of comparative example 1-5}) / (\text{measurement results of test tire}) \times 100$$

(2) Evaluation of Durability

After each test tire is installed on all wheels of a vehicle (domestic FF vehicle, displacement 2000 cc), and the tires are filled with air so that the internal pressure is 250 kPa, the vehicle drives on a dry test course in an overloaded state. The vehicle run 10 laps at a speed of 50 km/h, and repeatedly run over unevenness on the road surface at a speed of 80 km/h. The vehicle then run another lap at a speed of 50 km/h, then gradually increased the speed and measured the speed when the driver feels something unusual.

Next, the results in Comparative Examples 1-5 are set as 100, and the results are indexed based on the formula below to relatively evaluate the durability. The larger the value, the better the durability.

$$\text{Durability} = (\text{Measurement results of test tire}) / (\text{Measurement results of Comparative Example 1-5}) \times 100$$

(3) Overall Evaluation

The evaluation results of (1) and (2) above are summed to form a comprehensive evaluation.

(4) Evaluation Results

The results of each evaluation are shown in Tables 1 and 2.

TABLE 1

| | Example 1-1 | Example 1-2 | Example 1-3 | Example 1-4 | Example 1-5 |
|---|---|---|---|---|---|
| Size | 175/40R21 | 175/40R21 | 175/40R21 | 175/50R20 | 175/60R19 |
| (Parameter) | | | | | |
| E1-E2 (mass %) | 16 | 7 | −9 | 16 | 16 |
| Dt (mm) | 672 | 673 | 674 | 684 | 693 |
| V ($mm^3$) | 23136067 | 23632920 | 23244644 | 29697155 | 34599284 |
| Wt (mm) | 177 | 176 | 175 | 182 | 177 |
| Ht (mm) | 69 | 71 | 70 | 87 | 106 |
| Dt-2 × Ht (mm) | 534 | 531 | 534 | 510 | 481 |
| $(Dt^2 \times \pi/4)/Wt$ | 2004 | 2021 | 2039 | 2019 | 2131 |
| $(V + 1.5 \times 10^7)/Wt$ | 215458 | 219505 | 218541 | 245589 | 280222 |
| $(V + 2.0 \times 10^7)/Wt$ | 243707 | 247914 | 247112 | 273061 | 308471 |
| $(V + 2.5 \times 10^7)/Wt$ | 271955 | 276323 | 275684 | 300534 | 336719 |
| Aspect ratio (%) | 39 | 40 | 40 | 48 | 60 |
| (E1-E2) × Wt | 2832 | 1232 | −1575 | 2912 | 2832 |
| (Evaluation results) | | | | | |
| Crack resistance performance | 103 | 109 | 116 | 107 | 109 |
| Durability performance | 112 | 115 | 121 | 110 | 104 |
| Comprehensive evaluation | 215 | 224 | 237 | 217 | 213 |

TABLE 2

| | Comparative example 1-1 | Comparative example 1-2 | Comparative example 1-3 | Comparative example 1-4 | Comparative example 1-5 |
|---|---|---|---|---|---|
| Size | 175/80R14 | 175/60R19 | 175/80R14 | 175/80R14 | 175/80R14 |
| (Parameter) | | | | | |
| E1-E2 (mass %) | 24 | 24 | 16 | 7 | −9 |
| Dt (mm) | 636 | 693 | 635 | 637 | 636 |
| V ($mm^3$) | 38810340 | 34331262 | 38099665 | 38864768 | 38831091 |
| Wt (mm) | 177 | 177 | 175 | 176 | 178 |
| Ht (mm) | 141 | 105 | 140 | 142 | 140 |
| Dt-2 × Ht (mm) | 354 | 483 | 355 | 353 | 356 |
| $(Dt^2 \times \pi/4)/Wt$ | 1795 | 2131 | 1810 | 1811 | 1785 |
| $(V + 1.5 \times 10^7)/Wt$ | 304013 | 278708 | 303427 | 306050 | 302422 |
| $(V + 2.0 \times 10^7)/Wt$ | 332262 | 306956 | 331998 | 334459 | 330512 |
| $(V + 2.5 \times 10^7)/Wt$ | 360510 | 335205 | 360570 | 362868 | 358602 |
| Aspect ratio (%) | 80 | 59 | 80 | 81 | 79 |
| (E1-E2) × Wt | 4248 | 4248 | 2800 | 1232 | −1602 |

TABLE 2-continued

| | Comparative example 1-1 | Comparative example 1-2 | Comparative example 1-3 | Comparative example 1-4 | Comparative example 1-5 |
|---|---|---|---|---|---|
| (Evaluation results) | | | | | |
| Crack resistance performance | 90 | 92 | 94 | 95 | 100 |
| Durability performance | 87 | 90 | 92 | 94 | 100 |
| Comprehensive evaluation | 177 | 182 | 186 | 189 | 200 |

Experiment 2

In this experiment, tires of size 195 are produced and evaluated.

After manufacturing test tires of Examples 2-1 to 2-5 and Comparative Examples 2-1 to 2-5 shown in Tables 3 and 4 in the same manner as in Experiment 1, similarly, each parameter is determined. Then, a performance evaluation test is conducted and evaluated in the same manner. In this experiment, the evaluation is performed with the result in Comparative Example 2-5 set as 100. The results of each evaluation are shown in Tables 3 and 4.

TABLE 3

| | Example 2-1 | Example 2-2 | Example 2-3 | Example 2-4 | Example 2-5 |
|---|---|---|---|---|---|
| Size | 195/40R20 | 195/40R20 | 195/40R20 | 195/50R19 | 195/60R18 |
| (Parameter) | | | | | |
| E1-E2 (mass %) | 16 | 7 | −9 | 16 | 16 |
| Dt (mm) | 664 | 663 | 665 | 679 | 690 |
| V ($mm^3$) | 29037741 | 28492744 | 28624351 | 36078050 | 42045141 |
| Wt (mm) | 200 | 201 | 199 | 200 | 201 |
| Ht (mm) | 79 | 77 | 78 | 99 | 116 |
| Dt-2 × Ht (mm) | 506 | 509 | 509 | 481 | 458 |
| ($Dt^2$ × π/4)/Wt | 1731 | 1718 | 1745 | 1811 | 1860 |
| (V + 1.5 × $10^7$)/Wt | 220189 | 216382 | 219218 | 255390 | 283807 |
| (V + 2.0 × $10^7$)/Wt | 245189 | 241257 | 244343 | 280390 | 308682 |
| (V + 2.5 × $10^7$)/Wt | 270189 | 266133 | 269469 | 305390 | 333558 |
| Aspect ratio (%) | 40 | 38 | 39 | 50 | 58 |
| (E1-E2) × Wt | 3200 | 1407 | −1791 | 3200 | 3216 |
| (Evaluation results) | | | | | |
| Crack resistance performance | 106 | 112 | 119 | 110 | 114 |
| Durability performance | 114 | 116 | 123 | 111 | 106 |
| Comprehensive evaluation | 220 | 228 | 242 | 221 | 220 |

TABLE 4

| | Comparative example 2-1 | Comparative example 2-2 | Comparative example 2-3 | Comparative example 2-4 | Comparative example 2-5 |
|---|---|---|---|---|---|
| Size | 195/65R17 | 195/40R20 | 195/65R17 | 195/65R17 | 195/65R17 |
| (Parameter) | | | | | |
| E1-E2 (mass %) | 24 | 24 | 16 | 7 | −9 |
| Dt (mm) | 686 | 664 | 687 | 685 | 686 |
| V ($mm^3$) | 44555826 | 28399369 | 44686014 | 44796598 | 45052280 |
| Wt (mm) | 201 | 200 | 200 | 200 | 202 |
| Ht (mm) | 126 | 77 | 127 | 128 | 127 |
| Dt-2 × Ht (mm) | 434 | 510 | 433 | 429 | 432 |
| ($Dt^2$ × π/4)/Wt | 1839 | 1731 | 1853 | 1843 | 1830 |
| (V + 1.5 × $10^7$)/Wt | 296298 | 216997 | 298430 | 298983 | 297289 |
| (V + 2.0 × $10^7$)/Wt | 321173 | 241997 | 323430 | 323983 | 322041 |
| (V + 2.5 × $10^7$)/Wt | 346049 | 266997 | 348430 | 348983 | 346793 |
| Aspect ratio (%) | 63 | 39 | 64 | 64 | 63 |
| (E1-E2) × Wt | 4824 | 4800 | 3200 | 1400 | −1818 |
| (Evaluation results) | | | | | |
| Crack resistance performance | 87 | 89 | 91 | 93 | 100 |
| Durability performance | 85 | 89 | 90 | 93 | 100 |

TABLE 4-continued

| | Comparative example 2-1 | Comparative example 2-2 | Comparative example 2-3 | Comparative example 2-4 | Comparative example 2-5 |
|---|---|---|---|---|---|
| Comprehensive evaluation | 172 | 178 | 181 | 186 | 200 |

Experiment 3

In this experiment, tires of size 225 are produced and evaluated.

After manufacturing test tires of Examples 3-1 to 3-5 and Comparative Examples 3-1 to 3-5 shown in Tables 5 and 6 in the same manner as in Experiment 1, similarly, each parameter is determined. Then, a performance evaluation test is conducted and evaluated in the same manner. Note that in this experiment, the evaluation is performed with the result in Comparative Example 3-5 set as 100. The results of each evaluation are shown in Tables 5 and 6.

TABLE 5

| | Example 3-1 | Example 3-2 | Example 3-3 | Example 3-4 | Example 3-5 |
|---|---|---|---|---|---|
| Size | 225/35R22 | 225/35R22 | 225/35R22 | 225/50R20 | 225/40R21 |
| | | (Parameter) | | | |
| E1-E2 (mass %) | 16 | 7 | −9 | 16 | 16 |
| Dt (mm) | 716 | 717 | 718 | 735 | 713 |
| V ($mm^3$) | 36764174 | 36260445 | 37444351 | 51598171 | 41076519 |
| Wt (mm) | 230 | 229 | 231 | 232 | 231 |
| Ht (mm) | 80 | 79 | 81 | 114 | 91 |
| Dt-2 × Ht (mm) | 556 | 559 | 556 | 507 | 531 |
| ($Dt^2$ × π/4)/Wt | 1751 | 1763 | 1753 | 1829 | 1728 |
| (V + 1.5 × $10^7$)/Wt | 225062 | 223845 | 227032 | 287061 | 242755 |
| (V + 2.0 × $10^7$)/Wt | 246801 | 245679 | 248677 | 308613 | 264401 |
| (V + 2.5 × $10^7$)/Wt | 268540 | 267513 | 270322 | 330165 | 286046 |
| Aspect ratio (%) | 35 | 34 | 35 | 49 | 39 |
| (E1-E2) × Wt | 3680 | 1603 | −2079 | 3712 | 3696 |
| | | (Evaluation results) | | | |
| Crack resistance performance | 107 | 113 | 121 | 111 | 116 |
| Durability performance | 115 | 118 | 124 | 112 | 108 |
| Comprehensive evaluation | 222 | 231 | 245 | 223 | 224 |

TABLE 6

| | Comparative example 3-1 | Comparative example 3-2 | Comparative example 3-3 | Comparative example 3-4 | Comparative example 3-5 |
|---|---|---|---|---|---|
| Size | 225/60R20 | 225/50R20 | 225/60R20 | 225/60R20 | 225/60R20 |
| | | (Parameter) | | | |
| E1-E2 (mass %) | 24 | 24 | 16 | 7 | −9 |
| Dt (mm) | 779 | 734 | 777 | 778 | 777 |
| V ($mm^3$) | 63186979 | 51515082 | 61987073 | 61904251 | 62442698 |
| Wt (mm) | 230 | 232 | 229 | 227 | 228 |
| Ht (mm) | 136 | 114 | 134 | 135 | 136 |
| Dt-2 × Ht (mm) | 507 | 506 | 509 | 508 | 505 |
| ($Dt^2$ × π/4)/Wt | 2072 | 1824 | 2071 | 2094 | 2080 |
| (V + 1.5 × $10^7$)/Wt | 339943 | 286703 | 336188 | 338785 | 339661 |
| (V + 2.0 × $10^7$)/Wt | 361683 | 308255 | 358022 | 360812 | 361591 |
| (V + 2.5 × $10^7$)/Wt | 383422 | 329806 | 379856 | 382838 | 383521 |
| Aspect ratio (%) | 59 | 49 | 59 | 59 | 60 |
| (E1-E2) × Wt | 5520 | 5568 | 3664 | 1589 | −2052 |
| | | (Evaluation results) | | | |
| Crack resistance performance | 85 | 87 | 89 | 92 | 100 |
| Durability performance | 84 | 87 | 89 | 92 | 100 |
| Comprehensive evaluation | 169 | 174 | 178 | 184 | 200 |

Summary of Experiments 1 to 3

From the results of Experiments 1 to 3 (Tables 1 to 6), it is found that for tires of all sizes, 175 size, 195 size, and 225 size, a pneumatic tire with sufficiently improved crack resistance and durability can be provided, when (E1−E2)<20 and (formula 1) and (formula 2) are satisfied.

It has also been found that by satisfying each of the requirements specified in the second embodiment and subsequent embodiments, it is possible to provide a tire with further improved crack resistance and durability.

On the other hand, it is found that if either (formula 1) or (formula 2) is not satisfied, the crack resistance performance during high-speed running cannot be sufficiently improved, and the durability performance cannot be sufficiently improved.

Experiment 4

Next, three types of tires (Examples 4-1 to 4-3) with no significant difference in the relationship between virtual volume V and cross-sectional width Wt are produced with the same formulation and evaluated in the same manner. Here, in addition to the evaluation of crack resistance performance and durability performance, fuel efficiency performance is also evaluated.

Specifically, after each test tire is installed on all wheels of a vehicle (domestic FF vehicle, displacement 2000 cc), and the tires are filled with air so that the internal pressure is 250 kPa, the vehicle runs on a dry test course. After circling 10 km at a speed of 100 km/h, the accelerator is released, and the distance from when the accelerator is turned off until the vehicle stops is measured as rolling resistance during high-speed running. The larger the value, the longer the distance from when the accelerator is released until the vehicle stops, and the lower the rolling resistance in a steady state.

Next, the result in Example 4-3 is set as 100, and the fuel efficiency is evaluated by indexing based on the following formula. The larger the value, the lower the rolling resistance in a steady state and the better the fuel efficiency. The evaluation results are shown in Table 7.

$$\text{Fuel efficiency} = [(\text{measurement results of test tire})/(\text{measurement results of Example 4-3})] \times 100$$

Then, as in Experiments 1 to 3, the results of each evaluation are summed to form a comprehensive evaluation. The results of each evaluation are shown in Table 7.

TABLE 7

| | Example 4-1 | Example 4-2 | Example 4-3 |
|---|---|---|---|
| Sze | 175/55R18 | 195/50R19 | 225/45R20 |
| (Parameter) | | | |
| E1-E2 (mass %) | 13 | 13 | 13 |
| Dt (mm) | 650 | 678 | 709 |
| V ($mm^3$) | 30501789 | 35713625 | 43238996 |
| Wt (mm) | 181 | 200 | 226 |
| Ht (mm) | 97 | 98 | 100 |
| Dt-2 × Ht (mm) | 456 | 482 | 509 |
| ($Dt^2$ × π/4)/Wt | 1833 | 1805 | 1747 |
| (V + 1.5 × $10^7$)/Wt | 251391 | 253568 | 257695 |
| (V + 2.0 × $10^7$)/Wt | 279015 | 278568 | 279819 |
| (V + 2.5 × $10^7$)/Wt | 306640 | 303568 | 301942 |
| Aspect ratio (%) | 54 | 49 | 44 |
| (E1-E2) × Wt | 2353 | 2600 | 2938 |
| (Evaluation results) | | | |
| Crack resistance performance | 105 | 102 | 100 |
| Durability performance | 109 | 105 | 100 |
| Low fuel consumption performance | 110 | 105 | 100 |
| Comprehensive evaluation | 324 | 312 | 300 |

From Table 7, when there is no big difference in the relationship between the virtual volume V and the cross-sectional width Wt, as the cross-sectional width Wt becomes smaller, less than 205 mm and less than 200 mm, and as the aspect ratio becomes higher, the crack resistance performance, the durability performance, and the fuel efficiency are all improved; and it can be seen that a remarkable effect is exhibited.

[Manufacture of Rubber Composition for Tread 2]

Under the same conditions and in the same manner as in the "Manufacture of rubber composition for tread 1", except that 60 parts by mass of SBR (JSR1502 manufactured by JSR Corporation), 20 parts by mass of NR (RSS #3) and 20 parts by mass of BR (UBEPOL BR150B manufactured by Ube Industries, Ltd.) are used, instead of 90 parts by mass of SBR and 10 parts by mass of BR, a first rubber composition used in the production of a test tire in Experiment 5 is obtained.

In addition, under the same conditions and in the same manner as in the "Manufacture of rubber composition for tread 1", except that 100 parts by mass of NR (RSS #3) is used instead of 90 parts by mass of SBR and 10 parts by mass of BR, and blending amounts of oil, resin, silica, and carbon black are adjusted so that the AE amount is different from that of the first rubber composition, a second rubber composition used in the production of the test tire in Experiment 5 is obtained.

Experiment 5

Using the first rubber composition and second rubber composition produced in "Manufacture of rubber composition for tread 2", the same procedure as in Experiment 1 is carried out to manufacture test tires of Example 5 and Comparative Example 5 of the sizes shown in Table 8. After manufacturing each test tire, each parameter is determined in the same manner as in Experiment 1, and a performance evaluation test is similarly performed and evaluated. In this experiment, the result in Comparative Example 5 is set as 100 for evaluation. The results of each evaluation are shown in Table 8.

[Manufacture of Rubber Composition for Tread 3]

Under the same conditions and in the same manner as in the "Manufacture of rubber composition for tread 1", except that 50 parts by mass of NR (RSS #3) and 50 parts by mass of BR (UBEPOL BR150B manufactured by Ube Industries, Ltd.) are used instead of 90 parts by mass of SBR and 10 parts by mass of BR, a first rubber composition used in the production of a test tire of Experiment 6 is obtained.

In addition, under the same conditions and in the same manner as in the "Manufacture of rubber composition for tread 1", except that 50 parts by mass of NR (RSS #3) and 50 parts by mass of SBR (JSR1502 manufactured by JSR Corporation) are used instead of 90 parts by mass of SBR and 10 parts by mass of BR, and blending amounts of oil, resin, silica, and carbon black are adjusted so that the AE amount is different from that of the first rubber composition, a second rubber composition used in the production of the test tire in Experiment 6 is obtained.

Experiment 6

Using the first rubber composition and second rubber composition produced in "Manufacture of rubber composition for tread 3", the same procedure as in Experiment 1 is carried out to manufacture test tires of Example 6 and Comparative Example 6 of the sizes shown in Table 8. After manufacturing each test tire, each parameter is determined in the same manner as in Experiment 1, and a performance evaluation test is similarly performed and evaluated. In this experiment, the result in Comparative Example is set as 100 for evaluation. The results of each evaluation are shown in Table 8.

TABLE 8

| | Experiment 5 | | Experiment 6 | |
|---|---|---|---|---|
| | Example 5 | Comparative example 5 | Example 6 | Comparative example 6 |
| Size | 175/60R19 | 195/65R17 | 175/60R19 | 195/65R17 |
| | (Parameter) | | | |
| E1-E2 (mass %) | 15 | 15 | 14 | 14 |
| Dt (mm) | 693 | 687 | 692 | 686 |
| V ($mm^3$) | 34581743 | 44663360 | 34255500 | 44630015 |
| Wt (mm) | 177 | 200 | 177 | 199 |
| Ht (mm) | 106 | 127 | 105 | 128 |
| Dt-2 × Ht (mm) | 481 | 433 | 482 | 430 |
| ($Dt^2$ × π/4)/Wt | 2130 | 1852 | 2124 | 1856 |
| (V + 1.5 × $10^7$)/Wt | 280123 | 298317 | 278280 | 299648 |
| (V + 2.0 × $10^7$)/Wt | 308371 | 323317 | 306528 | 324774 |
| (V + 2.5 × $10^7$)/Wt | 336620 | 348317 | 334777 | 349900 |
| Aspect ratio (%) | 59 | 64 | 60 | 64 |
| (E1-E2) × Wt | 2655 | 3000 | 2478 | 2786 |
| | (Evaluation results) | | | |
| Crack resistance performance | 110 | 100 | 112 | 100 |
| Durability performance | 103 | 100 | 102 | 100 |
| comprehensive evaluation | 213 | 200 | 214 | 200 |

From Table 8, it is shown that even when the first rubber composition and the second rubber composition are rubber compositions containing other than SBR and BR, if (E1−E2)<20 and the above (formula 1) and (formula 2) are satisfied, both the crack resistance performance and the durability performance are improved, and the object of the present invention is achieved.

Although the present invention has been described above based on the embodiments, the present invention is not limited to the above embodiments. Various changes can be made to the above embodiments within the same and equivalent scope as the present invention.

What is claimed is:

1. A pneumatic tire having a tread portion with grooves formed on an outer surface and a cord layer below the outer surface, wherein the tread portion includes a groove bottom portion Gd that is formed of a first rubber composition and a second rubber composition adjacent to the first rubber composition on an inner side of the groove bottom portion Gd in the tire radial direction, wherein the groove bottom portion Gd has a thickness which is a distance in the tire radial direction from the groove bottom surface to the cord layer;

the first rubber composition has a loss tangent (0° C. tan δ) of 0.72 or more, measured under the conditions of 0° C., a frequency of 10 Hz, an initial strain of 10%, and a dynamic strain rate of 2.5%;

a ratio of the loss tangent (0° C. tan δ) of the first rubber composition to the thickness of the groove bottom portion Gd (mm) (0° C. tan δ/Gd) is 0.16 or less;

an acetone extractable content of the first rubber composition: E1 (% by mass) and an acetone extractable content of the second rubber composition: E2 (% by mass) satisfy (E1−E2) is 7 or less, wherein E1 and E2 are not equal;

the first rubber composition has the acetone extractable content E1 (% by mass) of 26% by mass or more;

the second rubber composition has the acetone extractable content E2 (% by mass) of 37% by mass or more;

when the tire is assembled to a standardized rim and has an internal pressure of 250 kPa, a cross-sectional width of the tire Wt (mm), an outer diameter Dt (mm), and a volume of the space occupied by the tire: virtual volume V ($mm^3$) satisfy (formula 1) and formula 2), $$1700 \leq \{Dt^2 \times \pi/4)/Wt \leq 2827.4 \quad \text{(formula 1)}$$

$$[\{V + 1.5 \times 10^7)/Wt] \leq 2.88 \times 10^5; \quad \text{(formula 2)}$$

and

Wt is 199 mm or more and Dt is 665 mm or less, or Wt is 229 mm or more and Dt is 718 mm or less; and (E1−E2)×Wt is 1603 or less.

2. The pneumatic tire according to claim 1, wherein, when the tire is assembled to the standardized rim and the internal pressure is 250 kPa, the outer diameter of the tire: Dt (mm), and a cross-sectional height of the tire: Ht (mm) satisfy 470≤(Dt−2×Ht).

3. The pneumatic tire according to claim 1, wherein the 0° C. tan δ is 0.75 or more.

4. The pneumatic tire according to claim 1, wherein the tread has multiple circumferential grooves that extend continuously in the tire circumferential direction, and a total cross-sectional area of the plurality of circumferential grooves is 10 to 30% of a cross-sectional area of the tread portion.

5. The pneumatic tire according to claim 1, wherein the tread has multiple lateral grooves extending in the axial direction of the tire, and a total volume of the plurality of lateral grooves is 2.0 to 5.0% of a volume of the tread portion.

6. The pneumatic tire according to claim 1, wherein the 0° C. tan δ/Gd is 0.14 or less.

7. The pneumatic tire according to claim 1, wherein the pneumatic tire has an aspect ratio of 34% to 44%.

8. The pneumatic tire according to claim 1, wherein the following (formula 3) is satisfied, $$[(V + 2.0 \times 10^7)/Wt] \leq 2.88 \times 10^5. \quad \text{(formula 3)}$$

9. The pneumatic tire according to claim 8, wherein the following (formula 4) is satisfied, $$[(V+2.5\times 10^7)/Wt] \leqq 2.88\times 10^5. \quad \text{(formula 4)}$$

10. The pneumatic tire according to claim 1, wherein the pneumatic tire has an aspect ratio of 40% or more.

11. The pneumatic tire according to claim 10, wherein the pneumatic tire has the aspect ratio of 45% or more.

12. The pneumatic tire according to claim 11, wherein the pneumatic tire has the aspect ratio of 47.5% or more.

13. A pneumatic tire having a tread portion with grooves formed on the surface, wherein the tread portion includes a groove bottom portion that is formed of a first rubber composition and a second rubber composition adjacent to the first rubber composition on the inner side of the groove bottom portion in the tire radial direction;

the first rubber composition has an acetone extractable content E1 (% by mass) of 26% by mass or more;

the second rubber composition has an acetone extractable content E2 (% by mass) of 37% by mass or more; and the acetone extractable content E1 (% by mass) and the acetone extractable content E2 (% by mass) satisfy (E1−E2) is 7 or less, wherein E1 and E2 are not equal; and when the tire is assembled to a standardized rim and has an internal pressure of 250 kPa, then a cross-sectional width of the tire Wt (mm), an outer diameter Dt (mm), and a volume of the space occupied by the tire: virtual volume V ($mm^3$) satisfy (formula 1) and (formula 2), $$1700 \leq \{Dt^2\times \pi/4\}/Wt \leq 2827.4 \quad \text{(formula 1)}$$

$$[\{V+1.5\times 10^7\}/Wt] \leq 2.88\times 10^5; \quad \text{(formula 2)}$$

and

Wt is 199 mm or more and Dt is 665 mm or less, or Wt is 229 mm or more and Dt is 718 mm or less; and (E1−E2)×Wt is 1603 or less.

* * * * *